(12) United States Patent
Kruse et al.

(10) Patent No.: US 11,201,893 B2
(45) Date of Patent: Dec. 14, 2021

(54) SYSTEMS AND METHODS FOR PERFORMING CYBERSECURITY RISK ASSESSMENTS

(71) Applicant: THE BOEING COMPANY, Chicago, IL (US)

(72) Inventors: David Thomas Kruse, St. Louis, MO (US); Benjamin Joseph Steffes, Saint Peters, MO (US); Nathan Mackey, Brentwood, MO (US); Moon Kim, Saint Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 198 days.

(21) Appl. No.: 16/596,298

(22) Filed: Oct. 8, 2019

(65) Prior Publication Data
US 2021/0105294 A1 Apr. 8, 2021

(51) Int. Cl.
*H04L 29/06* (2006.01)

(52) U.S. Cl.
CPC ........ *H04L 63/1433* (2013.01); *H04L 63/145* (2013.01); *H04L 63/1416* (2013.01); *H04L 63/1466* (2013.01)

(58) Field of Classification Search
CPC ............. H04L 63/1433; H04L 63/1416; H04L 63/145; H04L 63/1466
See application file for complete search history.

(56) References Cited

U.S. PATENT DOCUMENTS

| | | | |
|---|---|---|---|
| 7,530,105 B2 * | 5/2009 | Gilbert | G06F 21/55 709/222 |
| 7,573,866 B2 | 8/2009 | Nikolova et al. | |
| 9,749,339 B2 | 8/2017 | Kadambe et al. | |
| 10,084,661 B2 | 9/2018 | Zhao et al. | |
| 10,242,202 B1 | 3/2019 | Erickson et al. | |
| 2005/0193430 A1 * | 9/2005 | Cohen | G06F 21/577 726/25 |
| 2005/0246307 A1 | 11/2005 | Bala | |
| 2007/0067847 A1 * | 3/2007 | Wiemer | H04L 63/1433 726/25 |
| 2009/0048996 A1 | 2/2009 | Bala | |
| 2009/0077666 A1 * | 3/2009 | Chen | G06Q 10/0631 726/25 |

(Continued)

*Primary Examiner* — J. Brant Murphy
*Assistant Examiner* — Stephen T Gundry
(74) *Attorney, Agent, or Firm* — Armstrong Teasdale LLP

(57) ABSTRACT

A system for assessing potential cybersecurity threats to a subject system is provided. The system includes a computer system including at least one processor in communication with at least one memory device. The at least one processor is programmed to: receive a subject system to analyze, determine a potential hazard event associated with the subject system, generate an attack graph associated with the potential hazard event, wherein the attack graph includes a plurality of actions, determine an exploitability score for each of the plurality of actions, determine an uncertainty level for each of the plurality of actions based on the corresponding exploitability score, aggregate the plurality of actions including the corresponding exploitability scores and the corresponding uncertainty levels to determine one or more vulnerabilities of the subject system, and generate a response to the one or more vulnerabilities of the subject system.

20 Claims, 7 Drawing Sheets

(56) References Cited

U.S. PATENT DOCUMENTS

| | | |
|---|---|---|
| 2011/0137833 A1 | 6/2011 | Ide et al. |
| 2015/0242745 A1 | 8/2015 | Wang et al. |
| 2015/0244734 A1* | 8/2015 | Olson .................. G06F 21/577 726/25 |
| 2016/0191548 A1* | 6/2016 | Smith .................. G06F 21/565 726/23 |
| 2016/0205122 A1* | 7/2016 | Bassett ................ G06F 21/577 726/23 |
| 2016/0248795 A1* | 8/2016 | Chien ................. H04L 63/0245 |
| 2016/0253232 A1* | 9/2016 | Puri ..................... G06F 21/552 714/37 |
| 2016/0269434 A1* | 9/2016 | DiValentin .......... H04L 63/1408 |
| 2016/0269447 A1* | 9/2016 | Kailash ................. H04L 63/10 |
| 2016/0323295 A1* | 11/2016 | Joram .................. G06F 21/566 |
| 2016/0359899 A1* | 12/2016 | Zandani ............. H04L 63/1425 |
| 2016/0366174 A1* | 12/2016 | Chernin ............... G06F 21/577 |
| 2016/0378978 A1* | 12/2016 | Singla .................. G06F 21/554 726/23 |
| 2017/0098087 A1* | 4/2017 | Li ....................... H04L 63/1433 |
| 2017/0142150 A1* | 5/2017 | Sandke ................ G06F 21/566 |
| 2017/0142154 A1* | 5/2017 | Hagar ................. H04L 63/1483 |
| 2017/0201540 A1* | 7/2017 | Call ....................... G06F 21/54 |
| 2017/0230389 A1* | 8/2017 | Cochenour ......... H04L 63/1425 |
| 2017/0353477 A1 | 12/2017 | Faigon et al. |
| 2018/0262525 A1 | 9/2018 | Yan et al. |

\* cited by examiner

SYSTEMS AND METHODS FOR PERFORMING CYBERSECURITY RISK ASSESSMENTS

BACKGROUND

The field of the present disclosure relates generally to assessing potential cybersecurity threats and, more specifically, to automatically assessing potential cybersecurity threats to a subject system and determining potential countermeasures.

Methods to assess cybersecurity risk are varied and diverse but at a fundamental level, risk assessments generally consider the likelihood and consequence of a hazard event to be the primary variables in calculating risk. Cybersecurity risk assessments often make use of a semi-quantitative assessment of likelihood and consequence to derive various metrics of risk in the absence of true probabilities for likelihood or true measures of consequence. Most assessment methods define intentionally specific criteria that are used to segregate hazard events into various bins of likelihood and consequence. These methods convey an unfounded sense of certainty regarding the likelihood or consequence of hazard events and may artificially distance hazard events that in fact possess similar risk characteristics. Furthermore, the time to perform precise cybersecurity assessments is significant and requires significant amount of subject matter expertise, thereby greatly increasing their corresponding cost. By not including uncertainty as an assessment parameter, cybersecurity assessments are forced to expend significant resources to decrease uncertainty for all assessment inputs instead of the select few inputs most significantly affecting assessment results. Additionally, traditional cybersecurity risk assessment approaches often struggle to naturally represent assessment aspects related to subject systems that are not in fact part of the system (e.g. the physical security of the subject system). This limits the utility of these methods for assessing the overall security posture of a system.

BRIEF DESCRIPTION

In one aspect, a cybersecurity analyzing system for assessing potential cybersecurity threats to a subject system is provided. The system includes a computing device includes at least one processor in communication with at least one memory device. The at least one processor is programmed to: receive a subject system to analyze, determine a potential hazard event associated with the subject system, generate an attack graph associated with the potential hazard event, wherein the attack graph includes a plurality of actions, determine an exploitability score for each of the plurality of actions, determine an uncertainty level for each of the plurality of actions based on the corresponding exploitability score, aggregate the plurality of actions including the corresponding exploitability scores and the corresponding uncertainty levels to determine one or more vulnerabilities of the subject system, and generate a response to the one or more vulnerabilities of the subject system.

In another embodiment, a method for assessing potential cybersecurity threats to a subject system is provided. The method is implemented on a computing device including at least one processor in communication with at least one memory device. The method includes receiving a subject system to analyze, determining a potential hazard event associated with the subject system, generating an attack graph associated with the potential hazard event, wherein the attack graph includes a plurality of actions, determining an exploitability score for each of the plurality of actions, determining an uncertainty level for each of the plurality of actions based on the corresponding exploitability score, aggregating the plurality of actions including the corresponding exploitability scores and the corresponding uncertainty levels to determine one or more vulnerabilities of the subject system, and generating a response to the one or more vulnerabilities of the subject system.

In another embodiment, a non-transitory computer-readable media having computer-executable instructions embodied thereon is provided. When executed by at least one processor coupled to a memory device, the computer-executable instructions cause the processor to receive a subject system to analyze. The subject system to analyze is at least one of a computer and a computer network. The computer-executable instructions also cause the processor to determine a potential hazard event associated with the subject system and generate an attack graph associated with the potential hazard event. The attack graph includes a plurality of actions. The computer-executable instructions further cause the processor to determine an exploitability score for each of the plurality of actions. The exploitability score represents an adversary ability level to perform the corresponding actions. In addition, the computer-executable instructions cause the processor to determine an uncertainty level for each of the plurality of actions based on the corresponding exploitability score. The uncertainty level represents a confidence level associated with the determination of the exploitability score. Moreover, the computer-executable instructions cause the processor to aggregate the plurality of actions including the corresponding exploitability scores and the corresponding uncertainty levels to determine one or more vulnerabilities of the subject system. Furthermore, the computer-executable instructions cause the processor to determine one or more countermeasures based on the one or more vulnerabilities, apply the one or more countermeasures to the attack graph, aggregate the plurality of actions based on the one or more countermeasures, and generate a response to the one or more vulnerabilities of the subject system.

DETAILED DESCRIPTION

Figure 1:
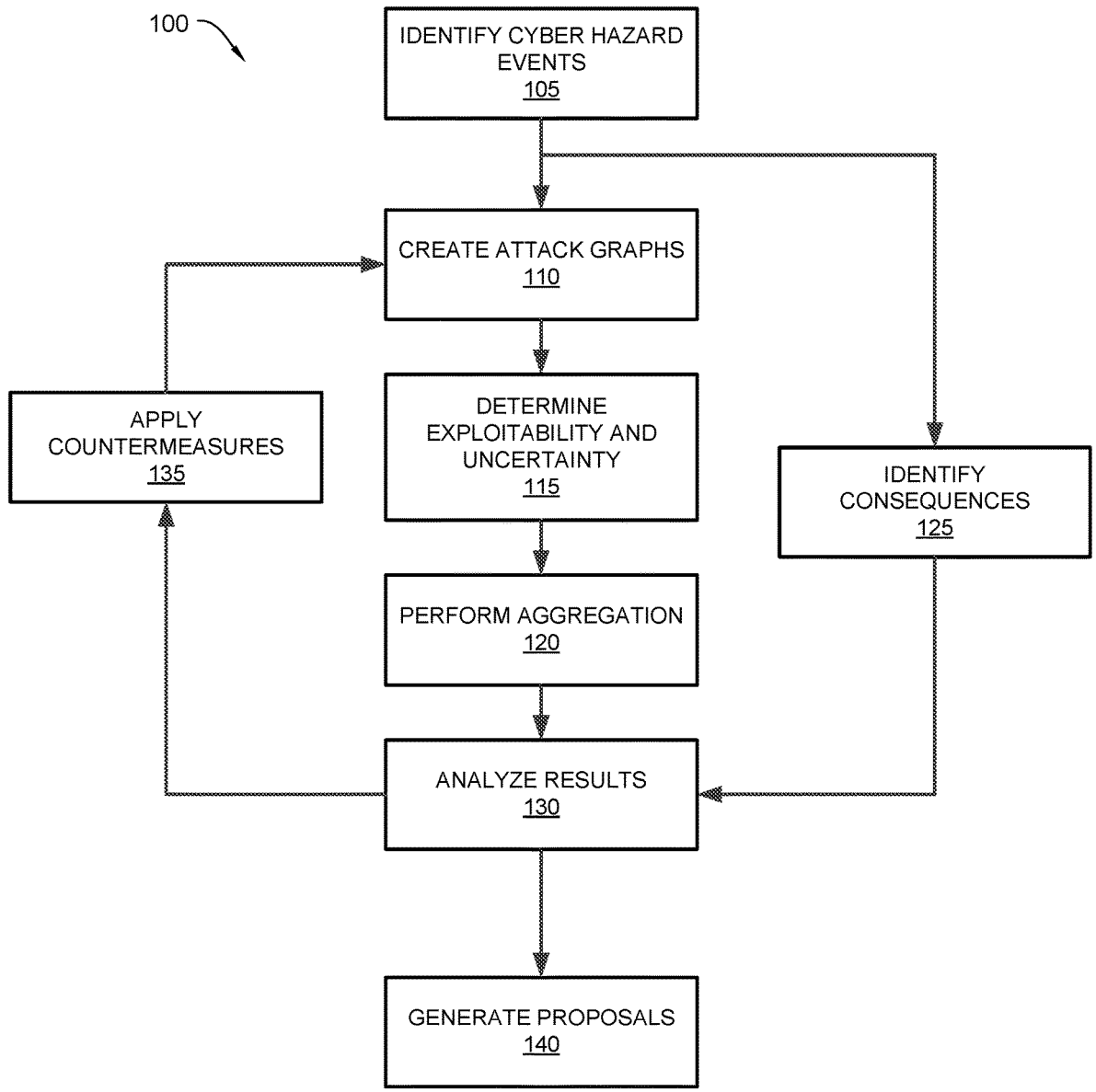
FIG. 1 illustrates a block diagram of a process to assess potential cybersecurity threats to a subject system and determine potential countermeasures, in accordance with one embodiment of the present disclosure

The implementations described herein relate to systems and methods for assessing potential cybersecurity threats and, more specifically, to automatically assessing potential cybersecurity threats to a subject system and determining potential countermeasures. More specifically, a cybersecurity analyzing ("CSA") computer device is provided for analyzing (1) one or more subject systems, such as computer systems or computer networks, for potential cyber-security threats and (2) attack path models for the subject system to determine the viability of potential attack paths and to determine potential countermeasures to reduce the viability of those potential attacks.

Described herein are computer systems such as the CSA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, the term "cybersecurity threat" includes an unauthorized attempt to gain access to a subject system. Cybersecurity threats, also known as cyber-attacks or cyber-threats, attempt to breach computer systems by taking advantage of vulnerabilities in the computer systems. Some cybersecurity threats include attempts to damage or disrupt a subject system. These cybersecurity threats may include, but are not limited to, active intrusions, spyware, malware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing a computing device, remotely via a communications network or connected system, or through an associated supply chain.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, New York; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of a process 100 to assess potential cybersecurity threats to a subject system and determine potential countermeasures, in accordance with one embodiment of the present disclosure. In the exemplary embodiment, process 100 is performed by one or more computer devices, such as cybersecurity analyzing (CSA) server 412 shown in FIG. 4.

In the exemplary embodiment, the CSA server 412 identifies 105 cyber hazard events. For the purposes of this discussion, cyber hazard events refer to an event that is caused by an adversary, which has the potential to cause damage, such as the exfiltration of a password, infection of a specific device, or loss of access to or data from a specific device or network. Cyber hazard events may include, but are not limited to, cybersecurity threats. Cyber hazard events may include both anomalous cyber events (e.g., events resulting from user error or random system failures) and adversarial events (e.g., events initiated by an adversary intending to cause negative effects). In the exemplary embodiment, hazard events are the results of a series of actions, including adversarial actions. These adversarial actions may in fact be hazard events themselves or simply other actions that set up the hazard event. Hazard events are then the ultimate outcomes that have a negative cyber effect. In some embodiments, the cyber hazard event is provided to the CSA server 412 by a subject matter expert or other user. In other embodiments, the CSA server 412 receives a list of cyber hazard events to analyze. In still other embodiments, the CSA server 412 receives a subject system and identifies 105 which cyber hazard events to analyze with that subject system.

For the purposes of this discussion, a subject system is a secure system. This may include a computer device or a computer network, but it also includes the individuals associated with the system, the location of the system, and any other physical objects or software that provide access to the system. For example, a subject system may include a computer network. In this case, the subject system would also include the users with access to the computer network, access to where the hardware of the computer network is stored, access to where the users work, the supply chain that provides the hardware of the subject system, and any other hardware or software that an adversary may use to access the subject system. Furthermore, the subject system may also be supply chains, server rooms or closets, paper filing systems, and/or any other system than needs to be secure from adversarial actions.

The CSA server 412 creates 110 attack graphs based on the subject system to be analyzed and the cyber hazard events. By considering a sequence of adversarial actions as nodes along a simple path, an attack path is created. An attack path is a "recipe" for an adversary to affect a cyber hazard event. Any given hazard event may have several associated attack paths. The CSA server 412 organizes these attack paths by combining paths with common nodes to create 110 an attack graph structure for each hazard event. In the exemplary embodiment, the resulting attack graphs are directed, acyclic graphs, which have defined entry points (leaf nodes) and a terminal point (root node corresponding with a hazard event). For a given attack graph, the sequences of adversarial events leading to the occurrence of the hazard event are found by enumerating each path originating at each leaf node and terminating at the root node—the hazard event. The CSA server 412 attempts to include all reasonable paths to prevent underestimation. In the exemplary embodiment, the CSA server 412 excludes attack paths that are not possible using existing technology or requires improbable events to occur.

In at least one embodiment, the CSA server 412 accesses a database of potential adversarial actions and historical attack paths to create 110 the attack graphs. In this embodiment, the CSA server 412 receives information about the subject system to be analyzed and automatically creates 110 the attack paths and the attack graphs for that subject system.

For the purposes of this discussion, the term likelihood in this context refers to the probability that a hazard event occurs. At a high level, the likelihood of a cybersecurity hazard event is a function of the following (not necessarily independent) factors: 1) Adversary intent: An adversary must choose which targets to exploit as time and resources generally prevent the exploitation of all targets; 2) Adversary ability: A given adversary generally cannot exploit any given target, where a top-tier nation state actor is typically assumed to pose the preeminent cybersecurity threat; and 3) System security/access: Systems may be isolated and protected by numerous countermeasures, and while some systems are trivial to penetrate, others are nearly impossible. Although likelihood can be thought of as a function of three factors, this assessment only considers the properties of the system. Properties of the adversary are difficult to ascertain and are often known only after an adversary has exploited a system. Therefore, only the properties of the system are generally considered.

To differentiate the metric used herein from the broader concept of likelihood, the term "exploitability" is used. This exploitability level is intended to express a threshold adversarial ability required to elicit a hazard event. A system that is more exploitable is assumed to be more easily attacked by a less capable adversary. Conversely, systems that are less exploitable can generally only be successfully attacked by a more capable adversary. In this interpretation, exploitability in the presence of some assumed adversary capabilities can be seen as the foundation of evaluating how secure a system is against attacks in general, irrespective of adversarial intent.

The CSA server 412 determines 115 exploitability and uncertainty values for each node of each attack graph. In the exemplary embodiment, the system uses a 1 to 5 integer scale to rate exploitability. Exploitability corresponds to the required adversary abilities to perform an action. Each node in the attack graph corresponds with a step in an attack. Therefore, the CSA server 412 rates each node with an exploitability score. The exploitability score is an assessment of the required adversarial ability to perform the action and continue down a path in the attack graph toward a cyber hazard event. The following table describes the correspondence between each exploitability level of and the required adversarial ability class.

TABLE 1

| Level | Description of adversarial ability required to exploit node |
|---|---|
| 1 | Top-tier nation-state military/intelligence agency with human intelligence |
| 2 | Lower-tier nation-state agency, organized crime groups, large professional hacker collectives |
| 3 | Small groups of professional hackers/criminals |
| 4 | Professional hacker working alone or mostly alone |
| 5 | Individual with basic technical skills equivalent to an engineering bachelor's degree |

For the purposes of the model, it is assumed that the adversary corresponding to the assigned exploitability level will successfully defeat the node 50% of the time exploitation is attempted. For example, if a node is assigned an exploitability level of 3, this means that a small group of professional hackers/criminals working together will successfully complete the corresponding action 50% of the time the action is attempted. This fact is a statistical artifact and does not necessarily aid in the assignment of exploitability levels to nodes. For the purposes of this discussion, exploitability is considered a threshold of possible exploitability not a threshold of certain exploitability.

In addition to an exploitability level for each node, the CSA server 412 assigns an uncertainty level to the node. This uncertainty level captures the confidence associated with the assignment of the exploitability level by the assessor. If the exploitability level is believed to be accurate (e.g. very high confidence that the assigned exploitability level corresponds with the actual exploitability), then the CSA server 412 assigns an uncertainty level of 1. If no knowledge of required ability is available, then the CSA server 412 assigns an uncertainty level of 4 which indicates even odds to each of the 5 exploitability bins. In this latter case, the exploitability level is irrelevant as even odds are assumed for each level. The table below describes the 4 uncertainty levels.

TABLE 2

| Level | Description of uncertainty level | Statistical description |
|---|---|---|
| 1 | The exploitability level of the assigned action/attack is known with a high degree of certainty | 5% uncertain |
| 2 | Various factors could adjust the exploitability level +/− one level, but the actual level is generally expected to take on the assigned level | 50% uncertain |
| 3 | The assigned exploitability level represents a very approximate value | 75% uncertain |
| 4 | It is unknown what the exploitability level ought to be. | Unknown, even odds for each exploitability level |

In at least one embodiment, the CSA server 412 accesses a database of actions and the exploitability and uncertainty values associated with them to determines 115 the exploitability and uncertainty values for each node of each attack graph. In this embodiment, the CSA server 412 receives information about the subject system to be analyzed and automatically determines 115 the exploitability and uncertainty values for each node.

The CSA server 412 performs 120 aggregation on the exploitability of each attack path in an attack graph. After each node in the attack graph is assigned an exploitability level and an uncertainty level, the exploitability of each attack path through the attack graph can be calculated. In the exemplary embodiment, the CSA server 412 simulates attacks within the attack graph. Each node in the graph can be considered as a filter that blocks or passes attacks based on adversary ability. Randomly-selected adversary abilities are applied to the head of each path and are then filtered in sequence by each node. Attacks that pass all the way through the attack graph are collected into bins by adversary ability to generate a distribution that represents the aggregated filtering function of the entire path.

In some embodiments, the filters along each path can be multiplied together in order to achieve the same result. As the number of simulation trials approaches infinity, the limit of the aggregate filter function at the end node is equal to the product of the filter functions for each node. This latter approach is far more computationally efficient. Once all of the paths for a given hazard event are aggregated into a set of filter distributions, the maximum is taken across all of these aggregated path distributions. This maximum of the path distributions is the distribution at the node corresponding with the hazard event. From this maximum distribution, the aggregated exploitability and uncertainty levels can be calculated for the hazard event node.

Effectively, the CSA server 412 analyzes all of the attack paths against all of the potential adversaries to determine the distribution. In some embodiments, the CSA server 412 accesses a database of stored attack paths to determine the distributions for those attack paths that have been analyzed previously.

The aggregated exploitability level for a particular hazard event is based on the driving nodes in the attack graph. More specifically, the aggregated exploitability level is driven to its value by a small number of nodes (typically less than 10% of nodes). By examining the attack graph, the CSA server 412 may identify these nodes. As a rudimentary measure of this concept, the exploitability density distributions for each node in an attack graph can be summed to provide a view of the spread of exploitability in the attack graph.

In some embodiments, a set of prototype attacks and exploits is stored in a database for comparison. For example, a table lists various attacks (e.g. insert malicious component in supply chain, infiltrate development environment, enter secured facility, etc.) along with a baseline exploitability and uncertainty value. Assumptions are also provided for the baseline exploitability and uncertainty levels. These assumptions may be used by the CSA server 412 and/or one or more users to make adjustments to the baseline exploitability and uncertainty scores as real-world applications require.

The CSA server 412 identifies 125 the consequences of each cyber hazard event. In most cyber risk assessment methodologies, consequence is captured on a semi-quantitative scale similarly to likelihood. This consequence is typically indexed to the mission of the system where a trivial consequence has no impact to the mission while the worst consequences typically are understood to be complete mission failure and/or loss of the system. These methods are highly effective in most cases and provide a basic comprehension of the distribution of consequence; however, the proportional difference between various consequences remains unknown.

To improve upon this paradigm, the systems and methods described herein use financial data to estimate a dollarized consequence for hazard events. These dollarized consequences can, in contrast to semi-quantitative consequences, show the proportional difference between different consequences. While in some situations, the cost data may be difficult to ascertain, collecting dollarized figures for commercial or development programs is achievable and should be done.

Once dollarized consequence data is known, the CSA server 412 applies a set of associated consequences to each hazard event, and a most probable consequence is established. In some industries, a consequence distribution is typically created, and the expected value of this distribution is taken to be the most likely consequence. When adversarial attacks are considered, however, it is reasonable to assume that the adversary will attempt the highest cost consequence that can be expected from a given hazard event. This assumption largely removes the concept of a distribution of consequences and yields one value.

The CSA server 412 analyzes 130 the results of the aggregation and the identified consequences. In some embodiments, the CSA server 412 analyzes 130 the exploitability score for each path as well as the cost of the consequences In some embodiments, the CSA server 412 compares the cost of the consequence to the cost of the countermeasures to determine whether to analyze the graphs with the countermeasures. The analysis may also guide the CSA server 412 in determining where and which countermeasures to use.

The CSA server 412 applies 135 countermeasures to the cyber hazard events and returns to steps 110 through 120. Once a baseline attack graph is constructed and the baseline exploitability, uncertainty, and consequences are calculated, the CSA server 412 may apply countermeasures to reduce the overall exploitability of a cyber hazard event as required to reduce risk. These countermeasures can be added as additional nodes in the attack graphs. The overall exploitability can then be recalculated, producing a mitigated cyber hazard event exploitability. The CSA server 412 is configured to consider countermeasures if the assigned exploitability of the countermeasure node is less than or equal to the current minimum exploitability in all mitigated paths for the hazard event. This principle ensures that countermeasures are not added that do not actually mitigate any risk or contribute to defense-in-depth, thus saving processing resources and delivering a parsimonious set of countermeasures.

In some embodiments, the CSA server 412 considers countermeasures in sets. For example, one set of countermeasures could contain countermeasures that balance risk reduction, cost impacts, and schedule impacts. Another set of countermeasures could contain all countermeasures that reasonably could be applied that minimize risk. This would give the assessor (CSA server 412 or user) an opportunity to evaluate what was implemented (presumably the balanced set of countermeasures) compared to the set of all possible countermeasures. In cases where the application of additional countermeasures beyond the balanced set does not substantially reduce risk, the determination may be that additional countermeasures may be an inefficient use of resources.

When the CSA server 412 has completed all of the analysis, the CSA server 412 generates 140 proposals for the analyzed subject systems to mitigate the cyber hazard events. These proposals may include the cost/consequences of each hazard event, the cost to mitigate (add countermeasures), the critical paths or paths of highest exploitability, and the risks with and without those countermeasures. This analysis assists the user in determining which actions are the easiest and most cost effective to mitigate.

While the above steps of process 100 are described as being performed by the CSA server 412, in some embodiments, the steps may be performed by a combination of the CSA server 412 and one or more users. In some embodiments, the CSA server 412 may perform one or more steps and then provide the results of those steps to a user or subject matter expert for potential adjustment.

In at least one embodiment, this analysis process may be expressed mathematically, including a truncated normal distribution for exploitability, a plurality of normalizations to facilitate the use of the truncated normal distribution, a plurality of methods for aggregating attack paths into a single exploitability and uncertainty level for each hazard event, and a metric for the use of countermeasures.

A truncated normal distribution may be used to describe exploitability. The truncated normal distribution is a normal distribution that has been truncated at some limits a and b. A scaling factor is applied to the truncated density function to re-normalize the integral of the probability density function to 1. If $f_{\mu,\sigma}(x)$ provides the normal distribution probability density function (PDF) then the truncated normal distribution PDF $f_{\mu,\sigma,a,b}(x)$ is given by Equation 1:

$$f_{\mu,\sigma,a,b}(x) = \frac{f_{\mu,\sigma}(x)}{\int_a^b f_{\mu,\sigma}(x)dx} \text{ for } x \in (a, b), 0 \text{ otherwise} \quad \text{EQ. 1}$$

where $\mu$ is the mean, $\sigma$ is the standard deviation, a is the lower truncation, and b is the upper truncation.

The previously described 1 to 5 scale is used to quantify exploitability. Since exploitability can be considered similar to probability, it is normalized to a 0 to 1 scale for further calculations. This normalization also naturally implements the desired property of stability in attack graph calculations using "normal" operations on real numbers. Equation 2 places the center of each exploitability bin offset from the center of the adjacent exploitability bin by 0.2 and starts with exploitability 1 at 0.1.

$$\hat{E} = \frac{E - 0.5}{5} \quad \text{EQ. 2}$$

where $\hat{E}$ is the normalized exploitability ($\hat{E} \in [0,1]$), E is the allocated exploitability level (valid $E \in [0.5:5.5]$ but is allocated such that $E \in \{1, 2, 3, 4, 5\}$). This normalization generates an aggregate exploitability for the attack path. This aggregate exploitability is partially a function of the length of the path in addition to the exploitability of the nodes themselves. This represents the issue that the more actions that the adversary must take, the more difficult the attack actually is.

For each uncertainty level, a standard deviation is supplied that corresponds to the definition of the level. Those standard deviations are provided below. These standard deviations only apply to the normalized exploitability (e.g. $\hat{E}$).

TABLE 3

| Level (U) | Standard Deviation ($\sigma_E$) |
|---|---|
| 1 | 0.05 |
| 2 | 0.15 |
| 3 | 0.4 |
| 4 | 100 |

The standard deviation for the case of Level 4 (a uniform distribution) would customarily be considered infinite (e.g., $\sigma E = \infty$) but an approximation is used in this case, which is accurate to several decimal places.

The uncertainty of the exploitability of each node is specified on a 1 to 4 scale divided into 4 bins. Calculations may be done using the truncated normal distribution with standard deviations mapped to each uncertainty bin. Once calculations are complete, the standard deviation values are translated back to the semi-quantitative, binned domain. The following functions allow for the interpolation of values using a smooth, piecewise function.

Equation 3 is used as a smooth, piecewise function for semi-quantitative input values $U \in [0, 4]$ that gives standard deviations values $\sigma_E \in [0, 100]$ as assigned according to the table above.

$$\sigma_E = \begin{cases} 0.05U^2 & \text{where } U \in [0, 1] \\ 0.1U - 0.05 & \text{where } U \in [1, 2] \\ 0.15U^2 - 0.5U + 0.55 & \text{where } U \in [2, 3] \\ 99.2U^2 - 594.8U + 892 & \text{where } U \in [3, 4] \end{cases} \quad \text{EQ. 3}$$

where $\sigma_E$ is the normalized exploitability standard deviation and U is the allocated exploitability uncertainty level.

As described above, the exploitability score corresponds to an adversarial ability with even odds of completing the action corresponding to the assigned node. This concept further implies that the odds of completing the action should be lower for an inferior adversary and higher for a superior adversary. The spread of these odds is proportional to the uncertainty. Conceptually, this creates a filter at each node which can be passed with greater ease by increasingly superior adversaries. Mathematically, this can be expressed using the complement of the cumulative density function (e.g., the survival function S(x)) of exploitability (Equation 4):

$$S_{\hat{E},\sigma_E}(x) = 1 - F_{\hat{E},\sigma_E} \quad \text{EQ. 4}$$

where $F_{\hat{E},\sigma_E}(x)$ is the cumulative density function for the truncated normal distribution (assume a=0 and b=1), $\hat{E}$ is the normalized exploitability level, $\sigma_E$ is the corresponding standard deviation for the normalized uncertainty level as shown in the above table, and x represents normalized exploitability levels (e.g., x∈[0,1]).

To aggregate exploitability along a path, the survival function for each node $$S_{\hat{E}n,\sigma_{En}}(x)$$

(x) is composed using multiplication over the set of nodes N in the path to yield an aggregated $S^{px}(x)$ for the path $p_x$ in an attack graph (Equation 5).

$$S^{px}(x) = \prod\nolimits^{n \in N(px)} S_{\hat{E}n,\sigma_{En}}(x) \quad \text{EQ. 5}$$

where $N(p_x)$ is the set of nodes in the path $p_x$, $$S_{\hat{E}n,\sigma_{En}}(x)$$

is the survival function of node n∈$N(p_x)$, and x represents normalized exploitability level (e.g., x∈[0,1]).

This can be used to aggregate the distributions for a given hazard event. A maximum value function may be used to create an aggregated survival function for every path $p_x$ in the set of paths P associated with a particular hazard event (Equation 6).

$$S^P(x) = \max_{p_x \in P}[S^{px}(x)] \quad \text{EQ. 6}$$

where $S^P(x)$ is the fully aggregated survival function for the hazard event, $S^{px}(x)$ is the survival function for the path px∈P, and P is the set of all paths leading to the relevant hazard event.

Once $S^P(x)$ is known for a hazard event, an aggregated mean and an uncertainty can be calculated. These values will be on the normalized scale (e.g. $\hat{E}$∈[0, 1] and $\sigma_E$∈[0, 100]) and will require conversion back to the semi-quantitative domain (e.g. E∈[0.5:5.5] and U∈[0, 4] respectively).

To add in the countermeasures, the countermeasure depth D(x) is defined as:

$$D(x) = \sum\nolimits^{n \in N(P)} f_{\hat{E}n,\sigma_{En}}(x) \quad \text{EQ. 7}$$

where N(P) is the set of unique nodes in the attack graph with set of paths P, $f_{\hat{E}n,\sigma_{En}}(x)$ is the PDF of the truncated normal distribution given a normalized exploitability and standard deviation for node n, and x represents normalized exploitability levels (e.g., x∈[0,1]).

Figure 2:
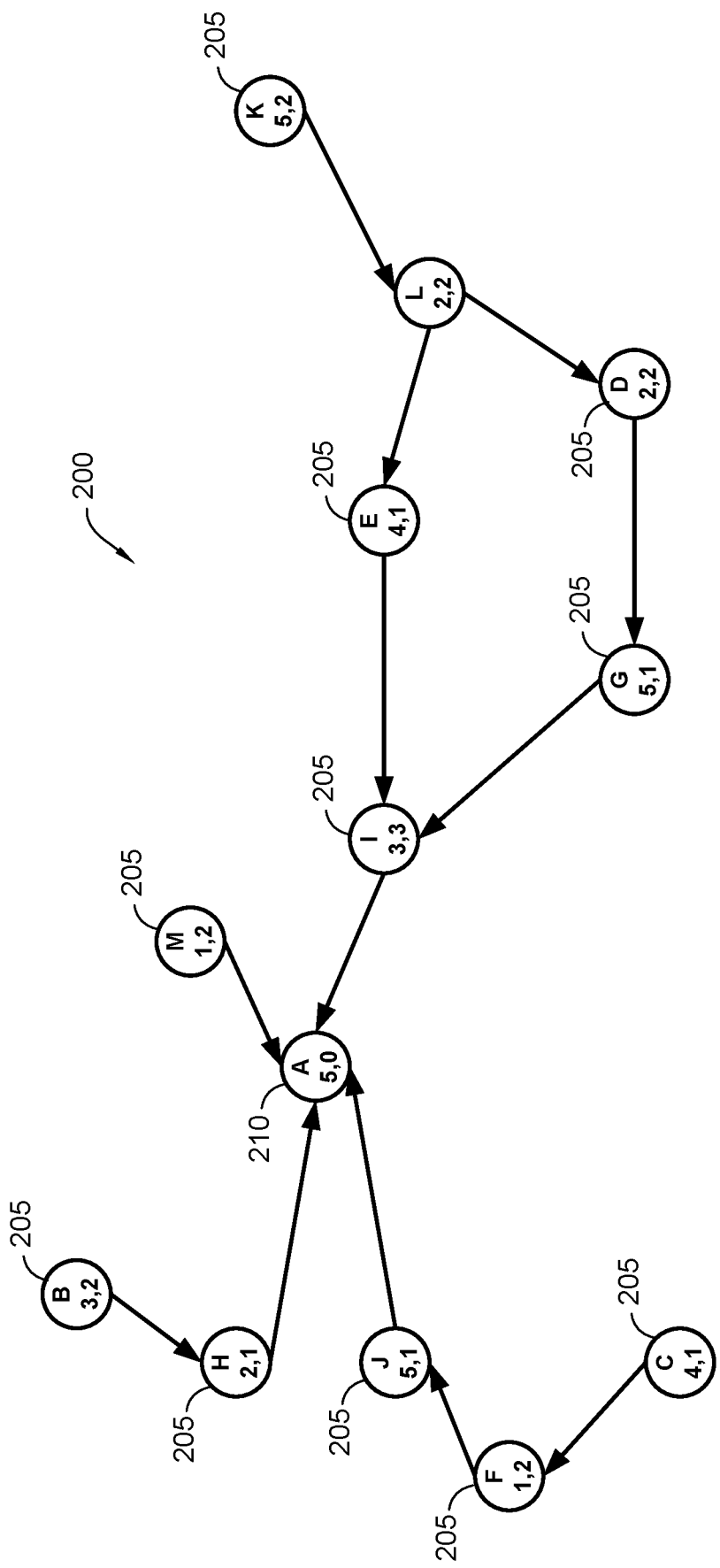
FIG. 2 illustrates an exemplary attack path diagram in accordance with one embodiment of the present disclosure.

FIG. 2 illustrates an exemplary attack path diagram 200 in accordance with one embodiment of the present disclosure. In the exemplary embodiment, diagram 200 reflects a simplified view of the various attack paths that an adversary could take to obtain the Wi-Fi password for a wireless local area network. Accordingly, the cyber hazard event for this example is the exfiltration of a password for the router. In the diagram 200, each node 205 represents an action, while Node A 210 represents the cyber hazard event itself.

Each node 205 includes an exploitability score followed by an uncertainty number (e.g., 3, 2). The description, exploitability score and uncertainty numbers for all of the nodes 205 shown in FIG. 2 are described below in Table 4.

TABLE 4

| Label | Node Description | Exploitation Score | Uncertainty Value |
| --- | --- | --- | --- |
| A | Passcode Exfiltrated | 5 | 0 |
| B | Encrypted Traffic Obtained | 3 | 2 |
| C | Password written down by network owner | 4 | 1 |
| D | Network owner compromising data identified | 2 | 2 |
| E | Passcode requested of network owner | 4 | 1 |
| F | Facility where passcode resides infiltrated | 1 | 2 |
| G | Blackmail data presented to network owner | 5 | 1 |
| H | Passcode Brute force attacked | 2 | 1 |
| I | Network owner divulges passcode | 3 | 3 |
| J | Passcode copy obtained | 5 | 1 |
| K | Contact established with network owner | 5 | 2 |
| L | Trust of network owner obtained | 2 | 2 |
| M | Malicious software installed on router | 1 | 2 |

As shown in FIG. 2, each node 205 represents an action that can be taken by an adversary. The exploitability score represents the required adversary abilities to perform the action. The uncertainty level captures the confidence associated with the assignment of the exploitability score. For example, the action for Node M is that malicious software may be installed on the router. This action received an exploitability score of 1, which represents a top-tier nation-state military/intelligence agency. The uncertainty level for this score is 2, which represents a 25% uncertainty level.

Figure 3:
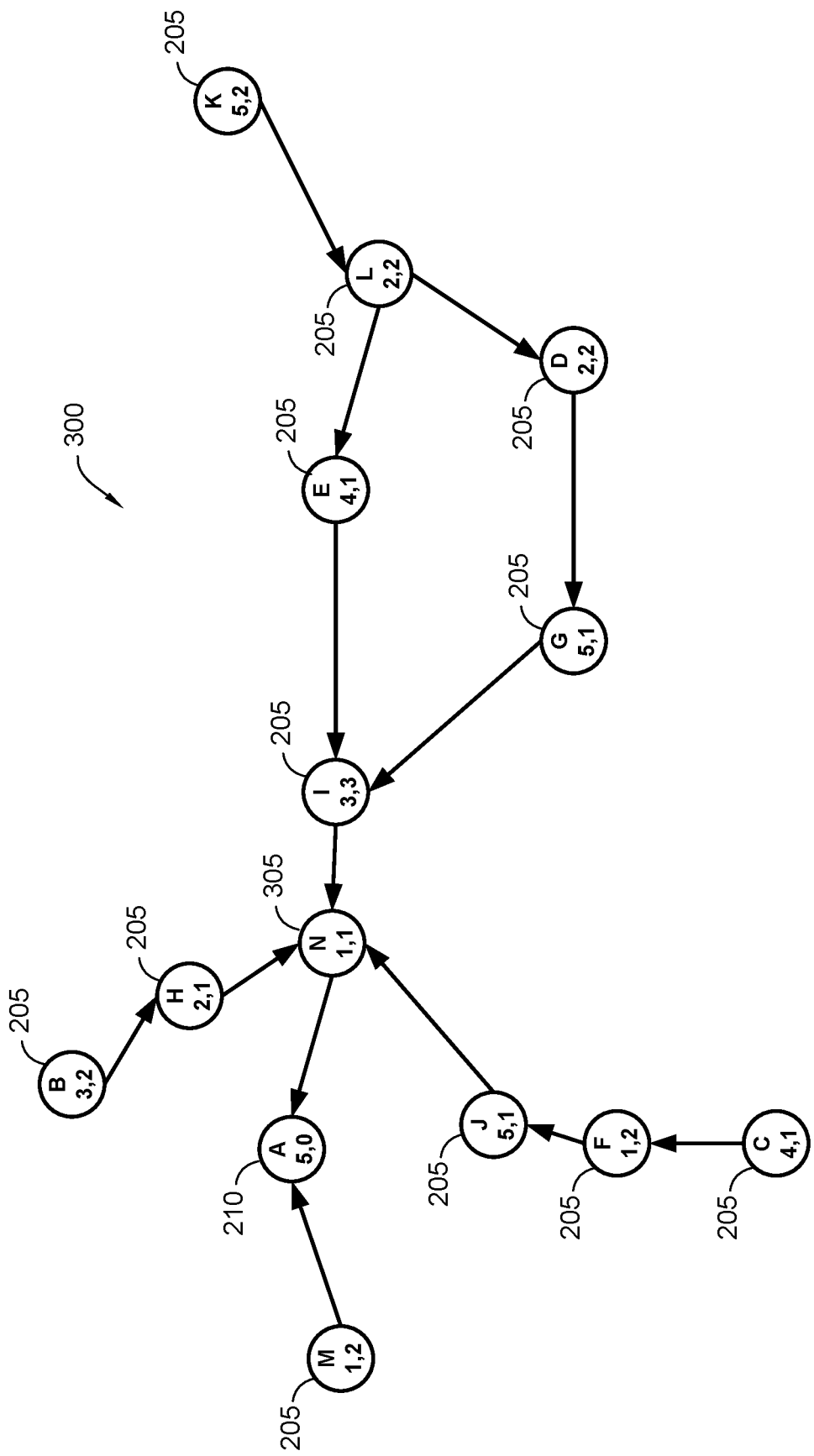
FIG. 3 illustrates another exemplary attack path diagram with a countermeasure in accordance with one embodiment of the present disclosure.

FIG. 3 illustrates another exemplary attack path diagram 300 with a countermeasure in accordance with one embodiment of the present disclosure. In the exemplary embodiment, diagram 300 reflects a simplified view of diagram 200 (shown in FIG. 2) with a countermeasure 305 (Node N)

added. The countermeasure 305 is periodic passcode changes, therefore the associated adversarial action is preventing periodic passcode changes. This action is assigned the exploitability score of 1, which means it requires a top-tier nation-state military/intelligence agency. The exploitability score has an uncertainty value of 1, which represents 5% uncertain, which is the most certain on this scale. Accordingly, for most of the attack paths shown, periodically changing the passcode decreases the risk for that attack path being used. However, it is not shown as affecting the attack path from Node M, where malicious software is installed on router.

Figure 4:
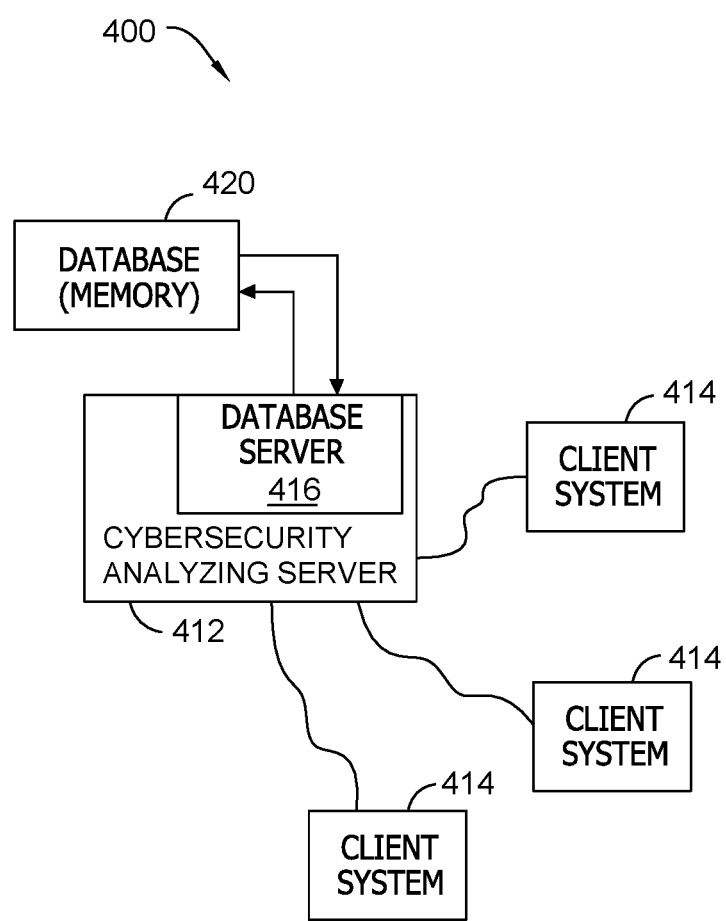
FIG. 4 is a simplified block diagram of an example system for assessing potential cybersecurity threats to a subject system, such as through the process shown in FIG. 1.

FIG. 4 is a simplified block diagram of an example system 400 for assessing potential cybersecurity threats to a subject system, such as through the process shown in FIG. 1. In the example embodiment, system 400 is used for assessing potential cybersecurity threats to the subject system and determining potential countermeasures to mitigate those potential cybersecurity threats. In addition, system 400 is a cyber-security management system that includes a cyber-security analyzing (CSA) computer device 412 (also known as a CSA server) configured to analyze for and determine countermeasures for cybersecurity threats.

As described below in more detail, CSA server 412 is programmed to analyze subject systems for potential hazard events. The CSA server 412 is programmed to a) receive a subject system to analyze; b) determine a potential hazard event associated with the subject system; c) generate an attack graph associated with the potential hazard event, wherein the attack graph includes a plurality of actions; d) determine an exploitability score for each of the plurality of actions; e) determine an uncertainty level for each of the plurality of actions based on the corresponding exploitability score; f) aggregate the plurality of actions including the corresponding exploitability scores and the corresponding uncertainty levels to determine one or more vulnerabilities of the subject system; and g) generate a response to the one or more vulnerabilities of the subject system.

In the example embodiment, client systems 414 are computers that include a web browser or a software application, which enables client systems 414 to communicate with CSA server 412 using the Internet, a local area network (LAN), or a wide area network (WAN). In some embodiments, client systems 414 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 414 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment.

A database server 416 is communicatively coupled to a database 420 that stores data. In one embodiment, database 420 is a cybersecurity database that includes computer device and network configurations, cybersecurity threats, attack paths, countermeasures, and computer device models. In some embodiments, database 420 is stored remotely from CSA server 412. In some embodiments, database 420 is decentralized. In the example embodiment, a person can access database 420 via client systems 414 by logging onto CSA server 412.

Figure 5:
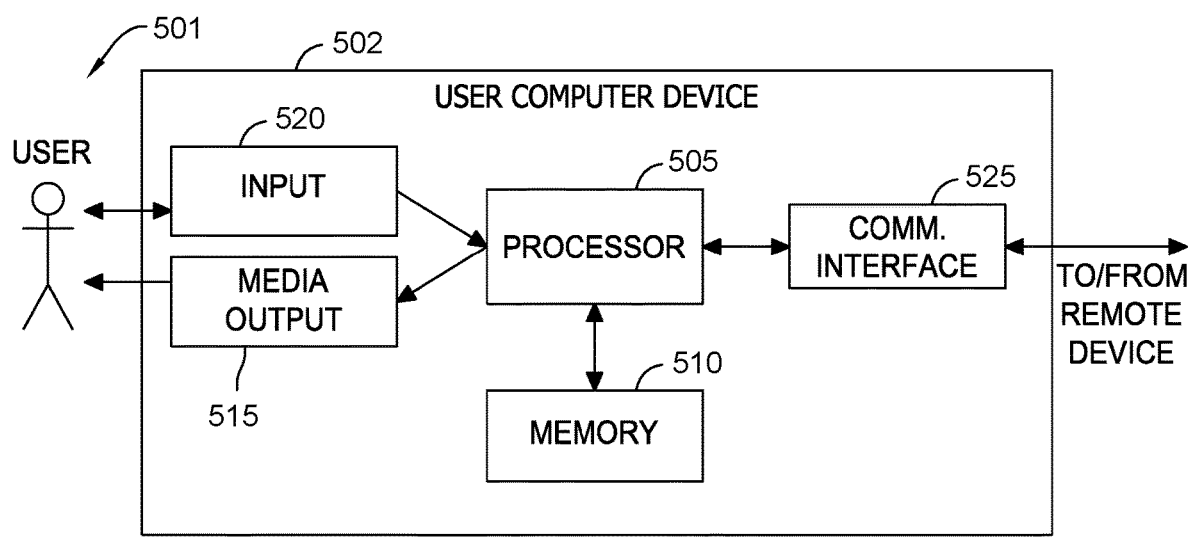
FIG. 5 illustrates an example configuration of a client computer device shown in FIG. 4, in accordance with one embodiment of the present disclosure.

FIG. 5 illustrates an example configuration of client system 414 shown in FIG. 4, in accordance with one embodiment of the present disclosure. User computer device 502 is operated by a user 501. User computer device 502 may include, but is not limited to, client systems 414 (shown in FIG. 4). User computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or transaction data to be stored and retrieved. Memory area 510 may include one or more computer-readable media.

User computer device 502 also includes at least one media output component 515 for presenting information to user 501. Media output component 515 is any component capable of conveying information to user 501. In some embodiments, media output component 515 includes an output adapter (not shown) such as a video adapter and/or an audio adapter. An output adapter is operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to user 501. A graphical user interface may include, for example, an interface for viewing the results of the analysis of one or more subject systems. In some embodiments, user computer device 502 includes an input device 520 for receiving input from user 501. User 501 may use input device 520 to, without limitation, select a computer system to view the analysis of Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as CSA server 412 (shown in FIG. 4). Communication interface 525 may include, for example, a wired or wireless network adapter and/or a wireless data transceiver for use with a mobile telecommunications network.

Stored in memory area 510 are, for example, computer-readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from CSA server 412. A client application allows user 501 to interact with, for example, CSA server 412. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed.

Figure 6:
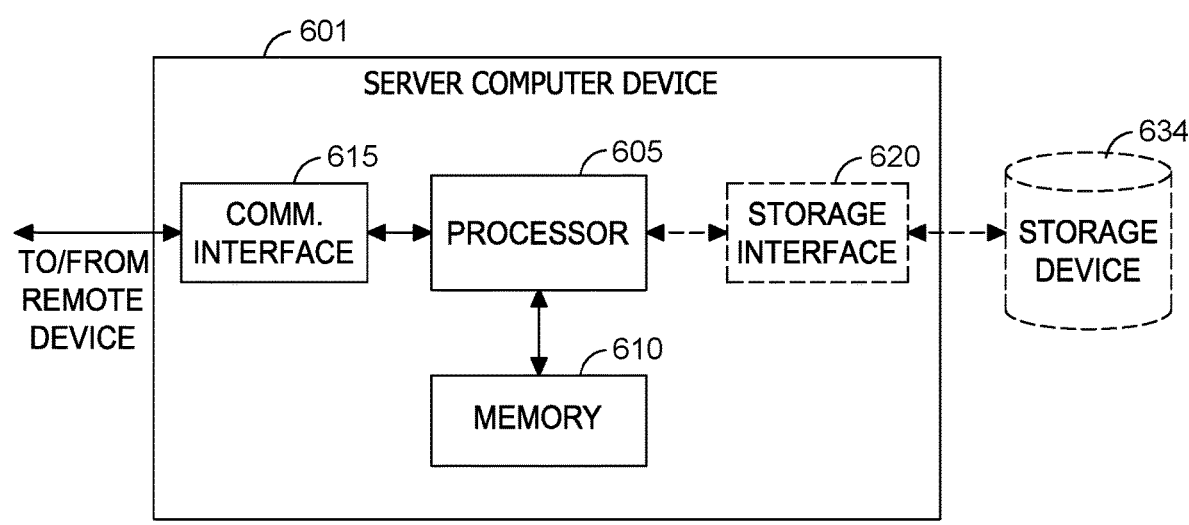
FIG. 6 illustrates an example configuration of the server system shown in FIG. 4, in accordance with one embodiment of the present disclosure.

FIG. 6 illustrates an example configuration of the server system 412 shown in FIG. 4, in accordance with one embodiment of the present disclosure. Server computer device 601 may include, but is not limited to, database server 416 and CSA server 412 (both shown in FIG. 4). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601, another CSA server 412, or client system 414 (shown in FIG. 4). For example, communication interface 615 may receive requests from client system 414 via the Internet, as illustrated in FIG. 4.

Processor 605 may also be operatively coupled to a storage device 634. Storage device 634 is any computer-operated hardware suitable for storing and/or retrieving data, such as, but not limited to, data associated with database 420 (shown in FIG. 4). In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with the instruction such as illustrated in FIG. 7.

Figure 7:
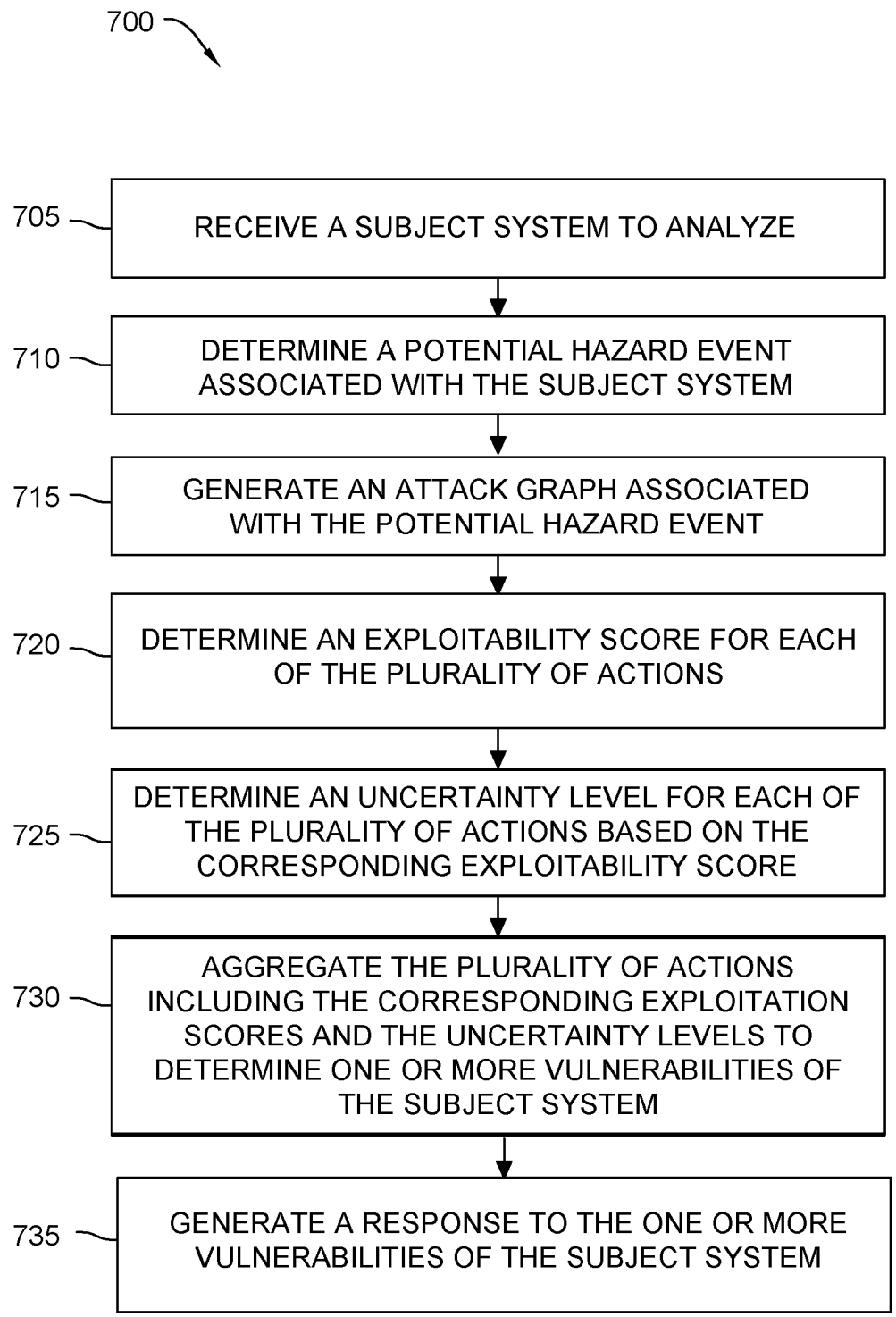
FIG. 7 is a flowchart illustrating an example of a process of assessing potential cybersecurity threats to a subject system and determining potential countermeasures using the system shown in FIG. 4, in accordance with one embodiment of the disclosure.

FIG. 7 is a flowchart illustrating an example of a process 700 of assessing potential cybersecurity threats to a subject system and determining potential countermeasures using the system 400 (shown in FIG. 4), in accordance with one embodiment of the disclosure. Process 700 may be implemented by a computing device, for example the CSA server 412 (shown in FIG. 4).

In the exemplary embodiment, the CSA server 412 receives 705 a subject system to analyze. The subject system may be, but it not limited to, a computer device, an Internet of Things device, or a computer network, as well as the hardware, software, and people that an adversary may compromise to access the subject system. In the exemplary embodiment, the CSA server 412 may receive information about the subject system to analyze, including, but not limited to, make, model, configuration, current settings, other connected devices, and any other information necessary to properly identify the subject system. In some embodiments, the CSA server 412 may look-up the subject system in a database, such as database 420 (shown in FIG. 4).

In the exemplary embodiment, the CSA server 412 determines 710 a potential hazard event associated with the subject system. In some embodiments, the CSA server 412 retrieves the potential hazard event from the database 420. The potential hazard event may be determined 710 based on similar subject systems and previously performed analysis. While only a single potential hazard event is mentioned, in the exemplary embodiment, the CSA server 412 may determine all of the potential hazard events that may be associated with the received subject system and perform analysis described herein on each of the potential hazard events.

In the exemplary embodiment, the CSA server 412 generates 715 an attack graph associated with the potential hazard event. The attack graph includes a plurality of actions and may be similar to the attack graph shown in FIG. 2. Each of the plurality of actions represents an adversarial action.

In the exemplary embodiment, the CSA server 412 determines 720 an exploitability score for each of the plurality of actions in the potential hazard event. The exploitability score represents an adversary ability level to perform the corresponding action. The CSA server 412 determines 725 an uncertainty level for each of the plurality of actions based on the corresponding exploitability score. The uncertainty level represents a confidence level associated with the determination of the exploitability score. In some embodiments, the CSA server 412 retrieves the exploitability scores and uncertainty levels from previously performed analyses. In other embodiments, the CSA server 412 calculates the exploitability scores and uncertainty levels based on one or more rules and historical values.

In the exemplary embodiment, the CSA server 412 aggregates 730 the plurality of actions including the corresponding exploitability scores and the corresponding uncertainty levels to determine one or more vulnerabilities of the subject system. In some embodiments, the CSA server 412 performs a mathematical analysis of the exploitability scores and uncertainty levels. In some embodiments, the attack graph includes a plurality of attack paths. Each attack path includes one or more actions of the plurality of actions. The CSA server 412 aggregates each of the plurality of attack paths based on the one or more actions associated with the corresponding attack path. In these embodiments, the one or more vulnerabilities are based on at least one of the plurality of attack paths.

In the exemplary embodiment, the CSA server 412 generates 735 a response to the one or more vulnerabilities of the subject system. In some embodiments, the response is a report about the potential vulnerabilities and the risk levels associated with them and the subject system. In other embodiments, the response may include potential countermeasures and the associated costs with those countermeasures.

In some embodiments, the CSA server 412 may determine one or more countermeasures based on the one or more vulnerabilities. These countermeasures may be determined based on information in the database 420. The CSA server 412 applies the one or more countermeasures to the attack graph and re-performs the above analysis to determine the effectiveness of the one or more countermeasures. The CSA server 412 re-aggregates the plurality of actions based on the one or more countermeasures.

In some embodiments, the CSA server 412 determines a plurality of potential hazard events for the subject system. The CSA server 412 generates an attack graph for each of the plurality of potential hazard events. Then the CSA server 412 aggregates the plurality of actions for each of the plurality of attack graphs based on the corresponding plurality of exploitability scores and the plurality of uncertainty levels to determine one or more vulnerabilities of the subject system.

At least one of the technical solutions to the technical problems provided by this system may include: (i) improved security systems; (ii) reduced time and cost in securing subject system; (iii) capturing considerations outside of the subject systems which influence the subject system (see above comment; (iv) identifying the most cost effective countermeasures; and (v) analyzing security of systems based on potential adversarial actions.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for analyzing computer systems for potential adversarial cybersecurity threats. The system and methods described herein address that technical problem. Additionally, at least one of the technical solutions to the technical problems provided by this system may include: (i) improved security systems; (ii) increased understanding of the potential attack paths against systems; (iii) determination of the effectiveness of different countermeasures in different systems; and (iv) improved time and efficiency of to perform an assessment of a system or subject system.

The methods and systems described herein may be implemented using computer programming or engineering techniques including computer software, firmware, hardware, or any combination or subset thereof, wherein the technical effects may be achieved by performing at least one of the following steps: (a) receive a subject system to analyze; (b) determine a potential hazard event associated with the subject system; (c) generate an attack graph associated with the potential hazard event, wherein the attack graph includes a plurality of actions; (d) determine an exploitability score for each of the plurality of actions; (e) determine an uncertainty level for each of the plurality of actions based on the corresponding exploitability score; (f) aggregate the plurality of actions including the corresponding exploitability scores and the corresponding uncertainty levels to determine one or more vulnerabilities of the subject system; and (g) generate a response to the one or more vulnerabilities of the subject system.

The technical effects may also be achieved by performing at least one of the following steps: (a) receive a subject system to analyze, wherein the subject system to analyze is at least one of a computer and a computer network; (b) determine a potential hazard event associated with the subject system; (c) generate an attack graph associated with the potential hazard event, wherein the attack graph includes a plurality of actions, wherein the attack graph includes a plurality of attack paths, wherein each attack path includes one or more actions of the plurality of actions, wherein each of the plurality of actions are adversarial actions; (d) determine an exploitability score for each of the plurality of actions, wherein the exploitability score represents an adversary ability level to perform the corresponding actions; (e) determine an uncertainty level for each of the plurality of actions based on the corresponding exploitability score, wherein the uncertainty level represents a confidence level associated with the determination of the exploitability score; (f) aggregate the plurality of actions including the corresponding exploitability scores and the corresponding uncertainty levels to determine one or more vulnerabilities of the subject system; (g) aggregate each of the plurality of attack paths based on the one or more actions associated with the corresponding attack path; (h) determine one or more countermeasures based on the one or more vulnerabilities; (i) apply the one or more countermeasures to the attack graph; (j) aggregate the plurality of actions based on the one or more countermeasures; and (k) generate a response to the one or more vulnerabilities of the subject system, wherein the one or more vulnerabilities are based on at least one of the plurality of attack paths In addition, the technical effects may also be achieved by performing at least one of the following steps: (a) determine a plurality of potential hazard events for the subject system; (b) generate an attack graph for each of the plurality of potential hazard events; and (c) aggregate the plurality of actions for each of the plurality of attack graphs based on the corresponding plurality of exploitability scores and the corresponding plurality of uncertainty levels to determine one or more vulnerabilities of the subject system.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cybersecurity analyzing system for assessing potential cybersecurity threats to a subject system, the system comprising:
a computing device comprising at least one processor in communication with at least one memory device, wherein the at least one processor is programmed to:
receive a subject system to analyze;
determine a potential hazard event associated with the subject system;
generate an attack graph associated with the potential hazard event, wherein the attack graph includes a plurality of actions, and wherein the plurality of actions includes at least one action that is a physical action outside of the subject system to analyze;
determine an exploitability score for each of the plurality of actions;
determine an uncertainty level for each of the plurality of actions based on the corresponding exploitability score;
aggregate the plurality of actions including the corresponding exploitability scores and the corresponding uncertainty levels to determine one or more vulnerabilities of the subject system; and
generate a response to the one or more vulnerabilities of the subject system.

2. The system of claim 1, wherein the subject system to analyze is at least one of a computer or a computer network.

3. The system of claim 1, wherein the exploitability score represents an adversary ability level to perform the corresponding action.

4. The system of claim 1, wherein the uncertainty level represents a confidence level associated with the determination of the exploitability score.

5. The system of claim 1, wherein the at least one processor is further programmed to:
determine one or more countermeasures based on the one or more vulnerabilities;
apply the one or more countermeasures to the attack graph; and
aggregate the plurality of actions based on the one or more countermeasures.

6. The system of claim 1, wherein the at least one processor is further programmed to:
determine a plurality of potential hazard events for the subject system;
generate a plurality of attack graphs based on each of the plurality of potential hazard events; and
aggregate the plurality of actions for each of the plurality of attack graphs based on the corresponding plurality of exploitability scores and the corresponding plurality of uncertainty levels to determine one or more vulnerabilities of the subject system.

7. The system of claim 1, wherein the attack graph includes a plurality of attack paths, and wherein each attack path includes one or more actions from the plurality of actions.

8. The system of claim 7, wherein the at least one processor is further programmed to aggregate each of the plurality of attack paths based on the one or more actions associated with the corresponding attack path.

9. The system of claim 7, wherein the one or more vulnerabilities are based on at least one of the plurality of attack paths.

10. The system of claim 1, wherein each of the plurality of actions are adversarial actions.

11. A method for assessing potential cybersecurity threats to a subject system, the method implemented on a computing device including at least one processor in communication with at least one memory device, the method comprising:
receiving a subject system to analyze;
determining a potential hazard event associated with the subject system;
generating an attack graph associated with the potential hazard event, wherein the attack graph includes a plurality of actions, and wherein the plurality of actions includes at least one action that is a physical action outside of the subject system to analyze;
determining an exploitability score for each of the plurality of actions;
determining an uncertainty level for each of the plurality of actions based on the corresponding exploitability score;
aggregating the plurality of actions including the corresponding exploitability scores and the corresponding uncertainty levels to determine one or more vulnerabilities of the subject system; and
generating a response to the one or more vulnerabilities of the subject system.

12. The method of claim 11, wherein the subject system to analyze is at least one of a computer or a computer network.

13. The method of claim 11, wherein the exploitability score represents an adversary ability level to perform the corresponding action.

14. The method of claim 11, wherein the uncertainty level represents a confidence level associated with the determination of the exploitability score.

15. The method of claim 11 further comprising:
determining one or more countermeasures based on the one or more vulnerabilities;
applying the one or more countermeasures to the attack graph; and
aggregating the plurality of actions based on the one or more countermeasures.

16. The method of claim 11 further comprising:
determining a plurality of potential hazard events for the subject system;
generating a plurality of attack graphs based on each of the plurality of potential hazard events; and
aggregating the plurality of actions for each of the plurality of attack graphs based on the corresponding plurality of exploitability scores and the corresponding plurality of uncertainty levels to determine one or more vulnerabilities of the subject system.

17. The method of claim 11, wherein each attack graph of the plurality of attack graphs includes a plurality of attack paths, wherein each attack path includes one or more actions of the plurality of actions, and wherein the method further comprises aggregating each of the plurality of attack paths based on the one or more actions associated with the corresponding attack path.

18. The method of claim 17, wherein the one or more vulnerabilities are based on at least one of the plurality of attack paths.

19. The method of claim 11, wherein each of the plurality of actions are adversarial actions.

20. A non-transitory computer-readable media having computer-executable instructions embodied thereon, wherein, when executed by at least one processor coupled to a memory device, the computer-executable instructions cause the processor to:

receive a subject system to analyze, wherein the subject system to analyze is at least one of a computer or a computer network;
determine a potential hazard event associated with the subject system;
generate an attack graph associated with the potential hazard event, wherein the attack graph includes a plurality of actions, and wherein the plurality of actions includes at least one action that is a physical action outside of the subject system to analyze;
determine an exploitability score for each of the plurality of actions, wherein the exploitability score represents an adversary ability level to perform the corresponding actions;
determine an uncertainty level for each of the plurality of actions based on the corresponding exploitability score, wherein the uncertainty level represents a confidence level associated with the determination of the exploitability score;
aggregate the plurality of actions including the corresponding exploitability scores and the corresponding uncertainty levels to determine one or more vulnerabilities of the subject system;
determine one or more countermeasures based on the one or more vulnerabilities;
apply the one or more countermeasures to the attack graph;
aggregate the plurality of actions based on the one or more countermeasures; and
generate a response to the one or more vulnerabilities of the subject system.

* * * * *